US012177657B2

(12) United States Patent
Rosencrantz et al.

(10) Patent No.: US 12,177,657 B2
(45) Date of Patent: Dec. 24, 2024

(54) TRUSTED SYSTEM FOR PRIVACY-PRESERVING VALIDATION OF INDIVIDUALS

(71) Applicant: AT&T Intellectual Property I, L.P., Atlanta, GA (US)

(72) Inventors: Rachel Rosencrantz, Seattle, WA (US); Doug Van Natter, Birmingham, AL (US); Maureen McCarthy-Ireland, Toms River, NJ (US); Jennifer Irons, Bayville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 375 days.

(21) Appl. No.: 17/577,504

(22) Filed: Jan. 18, 2022

(65) Prior Publication Data

US 2023/0232217 A1 Jul. 20, 2023

(51) Int. Cl.
*G06F 7/04* (2006.01)
*G06F 15/16* (2006.01)
*H04L 29/06* (2006.01)
*H04W 12/02* (2009.01)
*H04W 12/06* (2021.01)
*H04W 12/72* (2021.01)

(52) U.S. Cl.
CPC ........... *H04W 12/02* (2013.01); *H04W 12/06* (2013.01); *H04W 12/72* (2021.01)

(58) Field of Classification Search
CPC ...... H04W 12/02; H04W 12/06; H04W 12/72
USPC .......................................................... 726/26
See application file for complete search history.

(56) References Cited

U.S. PATENT DOCUMENTS

| 8,896,416 B1 * | 11/2014 | Lundy ................ G07C 9/00571 340/5.1 |
| 2016/0173478 A1 * | 6/2016 | Grigg .................. H04L 63/0815 726/7 |
| 2017/0118648 A1 * | 4/2017 | Marquardt ............ H04W 12/40 |
| 2021/0194703 A1 * | 6/2021 | Queralt ............... H04L 63/0815 |

* cited by examiner

*Primary Examiner* — Brandon Hoffman
*Assistant Examiner* — Samuel Ambaye
(74) *Attorney, Agent, or Firm* — Guntin & Gust, PLC; Andrew Gust

(57) ABSTRACT

Aspects of the subject disclosure may include, for example, receiving, from a computing device, a validation request for validating an individual associated with a mobile device equipped with an authentication app communicatively coupled with an authentication system, obtaining request data from a user validation system, enabling, using the request data, the computing device to communicate with the user validation system to facilitate the validation, wherein the validation involves the user validation system triggering the authentication system to provide access information to the computing device, the authentication system authenticating the individual/mobile device, the authentication system providing, to the user validation system, identification information of the individual based on the authenticating, and the user validation system determining a validation result based on data relating to the identification information. Aspects also include obtaining the validation result from the user validation system and causing the validation result to be presented. Other embodiments are disclosed.

20 Claims, 9 Drawing Sheets

300

TRUSTED SYSTEM FOR PRIVACY-PRESERVING VALIDATION OF INDIVIDUALS

FIELD OF THE DISCLOSURE

The subject disclosure relates to privacy-preserving validation of individuals.

BACKGROUND

Validating (or verifying) an individual generally involves an examination of the individual's government-issued/sanctioned documentation. Validations may include, for example, age checks (e.g., for restricting the sale of certain products to minors or restricting them from entry into certain establishments, such as bars, clubs, movie theaters, or the like) and vaccination checks (e.g., for restricting unvaccinated individuals from entering certain public/private places). Other types of validations may arise in the future.

BRIEF DESCRIPTION OF THE DRAWINGS

Reference will now be made to the accompanying drawings, which are not necessarily drawn to scale, and wherein.

DETAILED DESCRIPTION

Figure 1:
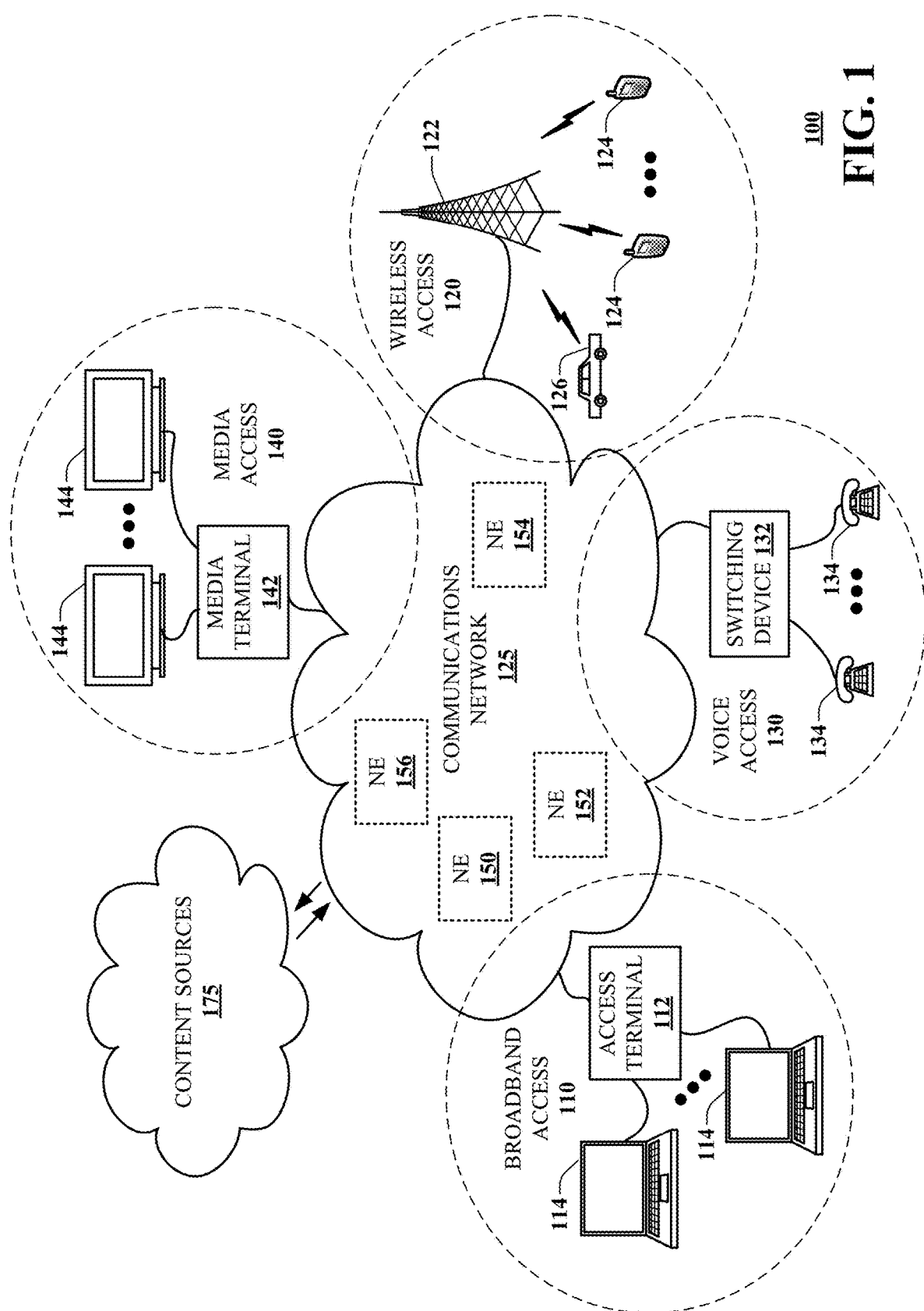
FIG. 1 is a block diagram illustrating an exemplary, non-limiting embodiment of a communications network in accordance with various aspects described herein.

While a government-issued ID can be used to validate one's age, for instance, such an ID typically includes other personal information—e.g., the individual's birthdate, physical address, height, etc.—that is not needed for mere age validation purposes. For example, a security guard at a bar or club can see some or all of this information when checking a person's ID at the entrance, which unnecessarily jeopardizes the individual's privacy. This can lead to harassment, social engineering risks, or other unwanted privacy issues. Furthermore, the use of digital wallets (where user information is stored on a mobile device and retrieved for validation purposes) is not necessarily more secure, since not all users "lock" their mobile devices, and the strength of passwords/pin numbers is generally weak.

The subject disclosure describes, among other things, illustrative embodiments of a trusted system that is capable of enabling privacy-preserving validation of an individual. Validation can include verification of an individual's age, vaccination status, and so on.

In exemplary embodiments, the trusted system may leverage an authentication system that provides mobile identity and authentication services, such as mobile/user identity verification via network operator authentication of subscriber accounts or subscriber identity modules (SIMs). In one or more embodiments, the authentication system may employ multi-factor authentication, and may include one or more (e.g., network) carrier- or provider-based authentication systems, instances of an authentication app individually installed on mobile devices of various users (such as individuals that may need to be validated), and an authentication management system that interacts with the authentication app(s) and the provider-based authentication system(s) to facilitate mobile/user identity verification(s).

In various embodiments, the trusted system may include a (e.g., third-party) backend system configured to effect backend communication with a user validation system/database to facilitate validations of individuals on behalf of validation requestors. A validation requestor may be a person or an entity that has a "need to know"—e.g., vendors that sell alcohol or other products associated with minimum age requirements, establishments that provide services to the public, etc. In one or more embodiments, the user validation system/database may store information regarding individuals (e.g., personally identifiable information (PII), such as birthdates, identification photos, health-related (e.g., vaccination) records, citizenship statuses, polling locations, driving restrictions, military statuses, military ranks/titles, corporate titles, membership statuses, government pay grades/scales, and/or the like), and may be configured to interact with the backend system, validation requestor end device(s) (e.g., computers, tablets, etc.), and/or one or more devices of the aforementioned authentication system to facilitate various operations, including (e.g., as described in more detail herein) verifying the identity of an individual, retrieving information regarding the individual in accordance with the verification, performing a validation of the individual based on the information, and providing result(s) of the validation. In certain embodiments, the trusted system may include a validation request app or website that provides a user interface (UI) configured to receive validation request(s) from a validation requestor and present validation result(s) obtained from the user validation system/database.

Embodiments of the trusted system leverage the ubiquity of mobile devices (e.g., mobile phones, tablets, smart watches, etc.) and an authentication management system to enable validations of individuals in a secure and reliable manner that is less prone to forgery. Utilizing the aforementioned authentication system for validation purposes also promotes widespread adoption thereof. Employing multi-factor (e.g., dual factor) authentication further improves the reliability of validations. Moreover, providing results of a validation in a yes/no style or manner (rather than in the form of specific information regarding an individual, such as the individual's actual birthdate, physical address, height, etc.) allows for age checks, vaccination status checks, and so on to be easily performed without a need to examine the individual's physical ID card or documentation, which preserves overall user privacy.

One or more aspects of the subject disclosure include a device, comprising a processing system including a processor, and a memory that stores executable instructions that, when executed by the processing system, facilitate performance of operations. The operations can include receiving, from a computing device, a validation request for validating an individual, wherein the individual is associated with a mobile device that is equipped with an authentication app communicatively coupled with an authentication system. Further, the operations can include, responsive to the receiving the validation request, obtaining validation request data from a user validation system. Further, the operations can include enabling, using the validation request data, the computing device to communicate with the user validation system so as to facilitate validation of the individual, wherein validation of the individual involves the user validation system triggering the authentication system to provide access information to the computing device for utilization by the mobile device, the authentication system authenticating the individual and the mobile device after the mobile device utilizes the access information, the authentication system providing, to the user validation system, identification information associated with the individual based on the authenticating, and the user validation system obtaining, based on the identification information, data regarding the individual and determining a validation result using the data. Further, the operations can include obtaining the validation result from the user validation system and causing the validation result to be presented.

One or more aspects of the subject disclosure include a non-transitory machine-readable medium, comprising executable instructions that, when executed by a processing system including a processor, facilitate performance of operations. The operations can include receiving, from a backend system, a request associated with validating an individual, wherein the individual is associated with a mobile device that is equipped with an authentication app communicatively coupled with an authentication system. Further, the operations can include, responsive to the receiving the request, generating request data and providing the request data to the backend system, wherein the request data, when utilized by a computing device associated with the backend system, causes a process to be performed for validating the individual. Further, the operations can include detecting use of the request data by the computing device. Further, the operations can include, based on the detecting, triggering the authentication system to provide access information to the computing device to be utilized by the mobile device. Further, the operations can include, after the triggering and authentication processing for the mobile device by the authentication system, obtaining, from the authentication system, identification information associated with the individual. Further, the operations can include determining a validation result using data relating to the identification information. Further, the operations can include causing the validation result to be provided to the computing device for presentation.

One or more aspects of the subject disclosure include a method. The method can comprise presenting, by a processing system of a computing device including a processor, a selectable option for initiating a validation process. Further, the method can include detecting, by the processing system, a user selection of the selectable option. Further, the method can include, based on the detecting the user selection, transmitting, by the processing system, a validation request to a backend system. Further, the method can include, responsive to the transmitting, obtaining, by the processing system, validation request data from the backend system, wherein the validation request data is provided by a user validation system based on the validation request. Further, the method can include performing, by the processing system and based on the validation request data, an action to cause the user validation system to initiate validation of an individual, wherein the individual is associated with a mobile device that is equipped with an authentication app communicatively coupled with an authentication system. Further, the method can include, based upon the performing, obtaining, by the processing system, access information from the authentication system. Further, the method can include presenting, by the processing system, the access information for utilization by the mobile device, wherein the utilization triggers authentication of the individual and the mobile device by the authentication system, providing of identification information associated with the individual by the authentication system to the user validation system, and determination of a validation result by the user validation system based on data associated with the identification information. Further, the method can include obtaining, by the processing system, the validation result from the user validation system or the backend system. Further, the method can include causing, by the processing system, the validation result to be presented for user review or consideration.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, privacy-preserving validation of an individual, such as that described herein with respect to FIGS. 2A-2D. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
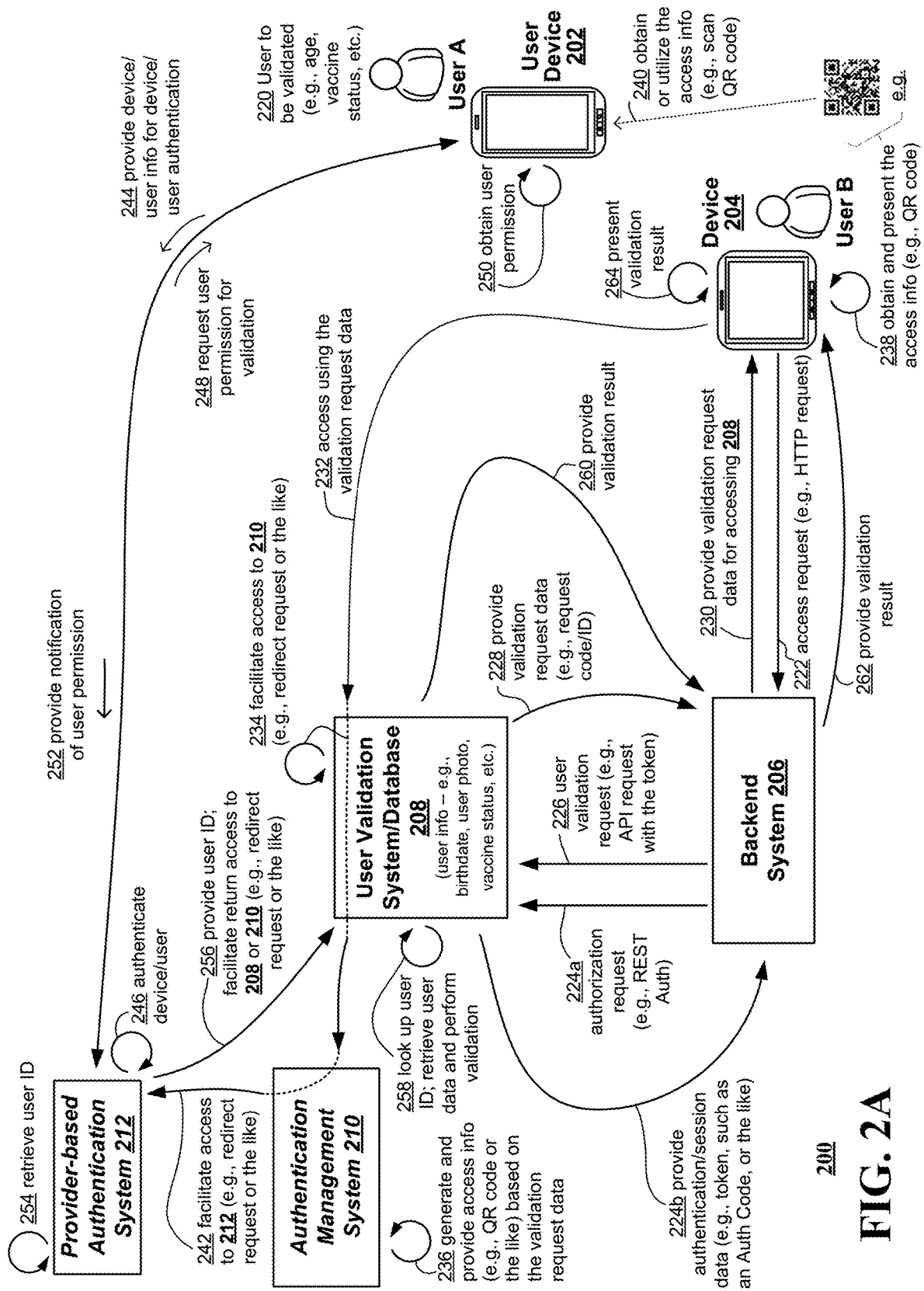
FIG. 2A is a block diagram illustrating an example, non-limiting embodiment of a system functioning within, or operatively overlaid upon, the communications network of FIG. 1 in accordance with various aspects described herein.

FIG. 2A is a block diagram illustrating an example, non-limiting embodiment of a trusted system 200 functioning within, or operatively overlaid upon, the communications network 100 of FIG. 1 in accordance with various aspects described herein. In exemplary embodiments, the trusted system 200 may be capable of enabling privacy-preserving validation of an individual, such as the individual's age, vaccination status, etc.

As shown in FIG. 2A, the trusted system 200 may include a user device 202, a device 204, a backend system 206, and a user validation system/database 208. Each of the devices 202, 204 can include a communication/computing device, such as a mobile phone (e.g., a smart phone, a radiotelephone, etc.), a wearable communication device (e.g., a smart wristwatch, a pair of smart eyeglasses, media-related gear (e.g., augmented reality (AR), virtual reality (VR), or mixed reality (MR) glasses and/or headset/headphones), etc.), a similar type of device, or a combination of some or all of these devices. As depicted in FIG. 2A, the user device 202 may correspond to a user A, and the device 204 may correspond to a user B.

In exemplary embodiments, the trusted system 200 may also include an authentication system that provides authentication-related functionalities implemented in one or more server devices for facilitating mobile/user identity verification. Here, for instance, the authentication system may include an authentication management system/server 210 and a provider-based authentication system/server 212. In exemplary embodiments, the authentication management system 210 and the provider-based authentication system 212 may be configured to communicate with one another as well as with respective authentication apps executing on mobile devices, such as the user device 202. In one or more embodiments, each of the authentication apps may function as a device-side client of the overall authentication system. In various embodiments, the provider-based authentication system 212 may correspond to (e.g., may be operated or provided by) a network carrier/provider associated with mobile devices, such as the user device 202.

In exemplary embodiments, the authentication management system 210 may coordinate with the provider-based authentication system 212 to facilitate verification of an identity of a user or user device based on subscriber/device/account information. In certain embodiments, some or all of the functionality of the authentication management system 210 may be alternatively included (or implemented) in the provider-based authentication system 212. In these embodiments, the trusted system 200 may or may not include the authentication management system 210.

In various embodiments, a user of a mobile device (e.g., user A of user device 202) may (e.g., initially) register with the authentication management system 210 and/or the provider-based authentication system 212, which may enable an authentication app on the mobile device to facilitate verification of the mobile device or the user when needed, such as when a validation requestor (e.g., user B of device 204) desires to validate the user. Registration may, for example, involve the provider-based authentication system 212 (or a related system) enabling a setting in the user's subscriber account to permit utilization of the identity verification feature of the authentication system for the user and/or the mobile device. When registered, the authentication app on the mobile device may—e.g., based upon a validation request—obtain information regarding the user and/or the mobile device (e.g., the user's name, SIM data stored in the mobile device, a device serial number (e.g., an International Mobile Equipment Identity (IMEI) number or the like), location data associated with the mobile device, data regarding a network access point to which the mobile device is communicatively coupled, biometric information of the user, and/or the like), and provide the information to the authentication management system 210 and/or the provider-based authentication system 212 for identity verification. Obtaining information regarding the mobile device and the user provides for multi-factor authentication (i.e., 2 or more layers of protection) since, in such a case, both a user's data (e.g., login password, fingerprint, etc.) and device data (e.g., SIM data, IMEI number, etc.) would be used for authentication, which obviates device cloning issues. In this way, for example, a network provider can validate that a certain mobile device is indeed the mobile device (and not another mobile device) and/or that a user is indeed the user (and not another individual).

In exemplary embodiments, the backend system 206 may be configured to facilitate validation requests submitted by validation requestors, such as device 204. The backend system 206 may initiate or coordinate communications among the device 204 and the user validation system/database 208, the authentication management system 210, and/or the provider-based authentication system 212 as part of a validation process. In various embodiments, the device 204 may be equipped with a validation request app that functions as a device-side client of the backend system 206.

In alternate embodiments, certain validation request functionalities may additionally, or alternatively, be provided via a web site implemented on the backend system 206 and accessible to the device 204 via a web browser or other similar application. In either case, the validation request app or web site may serve as a frontend system. In some embodiments, the backend system 206 and/or frontend may be provided/operated by an entity (e.g., the network carrier/provider) associated with the provider-based authentication system 212. In other embodiments, the backend system 206 and/or frontend may be provided/operated by a third-party entity.

In exemplary embodiments, the user validation system/database 208 may be configured to process validation requests submitted by end devices, such as device 204, including by (e.g., as described in more detail below) managing authentication/authorization of the backend system 206 and/or the device 204, receiving validation requests from the device 204, obtaining user identity information from the provider-based authentication system 212, performing user/device validations based on obtained user identity information, and providing validation results. In certain embodiments, the user validation system/database 208 may be a trusted source (e.g., a government-related entity, such as a Department of Motor Vehicles (DMV), a health agency, or the like) that stores various sorts of information regarding individuals. Information regarding an individual can include, for example, the individual's name, birthdate, physical address, phone number, e-mail address, identification photo, height/weight, vaccination status, etc. In various embodiments, the user validation system/database 208 may store/manage session records, and may (e.g., after validation session completions) write such records to one or more blockchains.

It is to be appreciated and understood that the quantities of the various devices/systems shown in FIG. 2A are merely exemplary. That is, the trusted system 200 may include any number of (e.g., more or fewer) user devices 202, devices 204, backend systems 206, user validation systems/databases 208, authentication management systems 210, and provider-based authentication systems 212. For instance, the trusted system 200 may include multiple provider-based authentication systems 212 (e.g., each corresponding to a particular network carrier/provider), multiple devices 204, multiple backend systems 206, multiple user devices 202 individually associated with one of the provider-based authentication systems 212, and so on.

Although not shown, in one or more embodiments, various of the devices and systems shown in FIG. 2A may be communicatively coupled to one another over one or more networks. Such network(s) may include one or more wired and/or wireless networks. For example, the network(s) may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

As described in more detail below, the backend system 206 and the device 204 can be used to obtain secure and reliable validation of an individual's information/status by leveraging trusted/reliable source(s)/system(s), such as the user validation system/database 208 and the abovementioned authentication system. In certain embodiments, the trusted system 200 may integrate a validation process (e.g., an age check, a vaccination status check, etc.) into a validation request app or web site communicable with the trusted source(s)/system(s).

As shown by reference number 220 of FIG. 2A, there may be a need to validate user A. For instance, user A may be present at a business location (e.g., a bar, a club, a movie theater, a market, etc.) that requires validation of user A, such as user A's age, vaccination status, etc., in order to sell product(s) and/or provide service(s) to user A, permit user A's entry into the location, and/or the like.

As shown by reference number 222, the device 204 may transmit an access (or validation) request (e.g., a Hypertext Transfer Protocol Secure (HTTPS) request or the like) to the backend system 206. In various embodiments, the device 204 may provide a user interface—e.g., via a validation request application (or app) or web page—that is associated with the backend system 206, and that enables a user, such as user B (e.g., a bartender, a customer representative, a store clerk, etc.), to initiate a validation process. For instance, the validation request app or web page may provide a user selectable option to log onto the backend system 206 and/or request initiation of a validation process. Although not shown, in one or more embodiments, the validation request app or web page may include (or may be included as part of) a management app or web page that provides customer service functions/options, such as menu(s) of products/services, calendar(s) for managing bookings, sales/billing processing, and/or the like.

In various embodiments, device 204 and/or user B may be associated with one or more accounts or profiles registered with the backend system 206 and/or the user validation system/database 208, which enables the device 204 to engage in validation processes described herein. This can facilitate tracking/recording of validation requests, and can also ensure that only authorized parties who have a "need to know" can submit validation requests. In one or more embodiments, an account may include redirect uniform resource locator(s) (URL(s)) for return redirect(s), an authorization code (e.g., for REST authentication), and/or the like.

As shown by reference number 224a, the backend system 206 may, based upon receiving the access (or validation) request, transmit an authorization request (e.g., REST auth) to the user validation system/database 208. As shown by reference number 224b, the user validation system/database 208 may, based upon receiving and processing the authorization request (e.g., by confirming that the backend system 206 is authenticated and/or has authorization to communicate with and utilize the user validation system/database 208), provide authentication/session data (e.g., a token, such as an Auth Code, or the like) to the backend system 206.

Figure 2B:
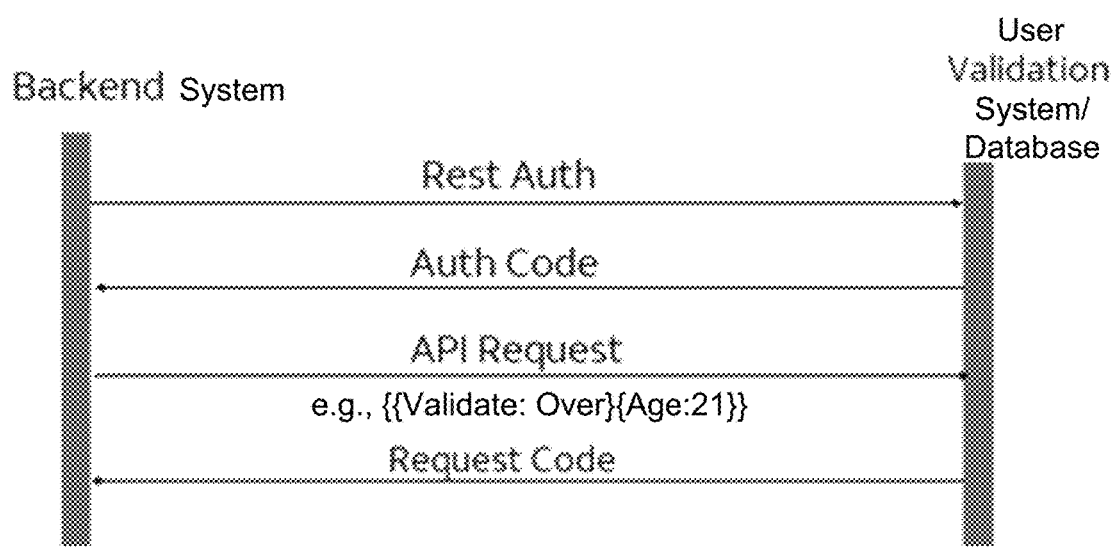
FIG. 2B depicts an illustrative embodiment of a data flow in accordance with various aspects described herein.

As shown by reference number 226, the backend system 206 may transmit a validation request (e.g., an API request that includes the authentication/session data (or token)) to the user validation system/database 208. In various embodiments, the validation request may include information regarding the type of validation requested (e.g., age check, vaccination status check, etc.). In some embodiments, the validation request may additionally, or alternatively, include information that identifies user B, the device 204, and/or an entity associated therewith (e.g., Joe's Bar). As shown by reference number 228, the user validation system/database 208 may respond with validation request data (e.g., a request code/ID). Here, the request code/ID may be used for requesting/tracking validation of a user, such as user A. In one or more embodiments, the user validation system/ database 208 may log the validation request for tracking purposes. An example data flow representative of steps 224a, 224b, 226, and 228 is shown in FIG. 2B.

As shown by reference number 230 in FIG. 2A, the backend system 206 may provide, to the device 204, the validation request data for presentation or use thereof via the validation request app or browser. In various embodiments, the backend system 206 may provide the validation request data in the form of a URL that includes the validation request data, and that (e.g., automatically or upon user selection) directs/redirects the validation request app or browser to the user validation system/database 208.

As shown by reference number 232, the device 204 may transmit a request that includes the validation request data (e.g., a unique request code/ID) to the user validation system/database 208. In various embodiments, transmission of the request may involve selection or use of the above-mentioned validation request data in the form of a URL associated with the user validation system/database 208 (e.g., a link to the user validation system/database 208 appended with "/?code=<Request_Code>" or the like).

Figure 2C:
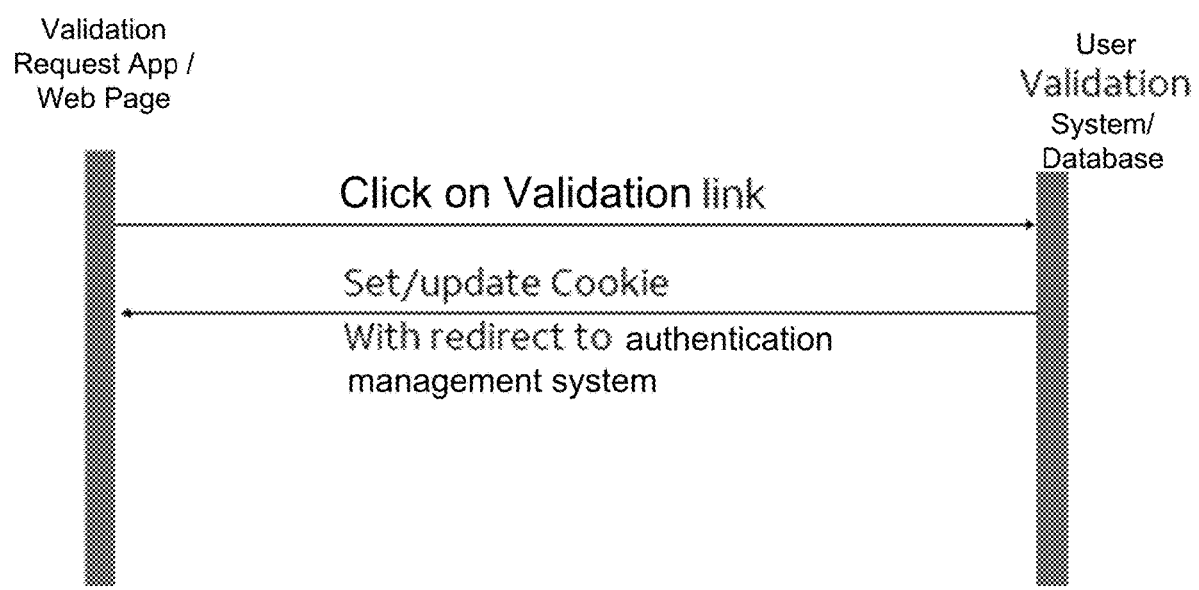
FIG. 2C depicts an illustrative embodiment of a data flow in accordance with various aspects described herein.

As shown by reference number 234, the user validation system/database 208 may, based upon detecting the request, facilitate access to the authentication management system 210. In various embodiments, for example, the user validation system/database 208 may facilitate the access via a redirect request or the like such that the validation request app or browser of the device 204 is directed/redirected to the authentication management system 210 to trigger device/user authentication by a provider-based authentication system. In some embodiments, facilitation of the access may involve setting/updating of one or more cookies. An example data flow representative of steps 232 and 234 is shown in FIG. 2C. In one or more embodiments, the user validation system/database 208 may also provide the validation request data to the authentication management system 210.

As shown by reference number 236 in FIG. 2A, the authentication management system 210 may generate access information (e.g., a quick response (QR) code or the like), and provide the access information to the device 204. In one or more embodiments, the authentication management system 210 may generate the access information based on the validation request data.

As shown by reference number 238, the device 204 may obtain and present the access information, and as shown by reference number 240, the user device 202 may obtain or utilize the access information. In exemplary embodiments, the authentication app of the user device 202 may obtain or utilize the access information. In a case where the access information includes a QR code, for example, the device 204 may display the QR code, and user A may utilize the authentication app of the user device 202 to scan the displayed QR code. In one or more embodiments, utilization of the access information may cause the user device 202 to communicate with the authentication management system 210 to facilitate device/user authentication.

As shown by reference number 242, the authentication management system 210 may, e.g., based upon identifying that the user device 202 is associated with the provider-based authentication system 212, facilitate access to the provider-based authentication system 212. In exemplary embodiments, the authentication management system 210 may facilitate the access via a redirect request or the like such that the validation request app or browser of the device 204 is directed/redirected to the provider-based authentication system 212. In one or more embodiments, the authentication management system 210 may provide a notification to the provider-based authentication system 212 indicating that one of its associated users/user devices (e.g., user A and/or user device 202) needs to be verified. In various embodiments, the authentication management system 210 may provide a notification to the user validation system/database 208 indicating that the provider-based authentication system 212 is performing the device/user authentication.

Although not shown, in certain embodiments, the validation request app or web page may (e.g., responsive to one or more redirects) be updated with information regarding the status of the validation process. For instance, here, the validation request app or web page may obtain status information indicating that device/user authentication is in progress.

As shown by reference number 244, the user device 202 may provide device/user information to the provider-based authentication system 212 for device/user authentication. In exemplary embodiments, the authentication app of the user device 202 may obtain information regarding user A and/or the user device 202 (e.g., user A's name, SIM data stored in the user device 202, a serial number (e.g., an IMEI number or the like) associated with the user device 202, location data associated with the user device 202, data regarding a network access point to which the user device 202 is communicatively coupled, biometric information of user A, and/or the like), and provide the information to the provider-based authentication system 212 for identity verification. As shown by reference number 246, the provider-based authentication system 212 may authenticate the user device 202 and/or user A based on this information.

As shown by reference number 248, the provider-based authentication system 212 may, based upon authenticating the user device 202 and/or user A, transmit a request to the user device 202 for user A's permission to engage in a validation process. Based upon obtaining (250) permission from user A, the user device 202 may respond (252) to the provider-based authentication system 212 with an indication of the permission.

As shown by reference number 254, the provider-based authentication system 212 may obtain/retrieve a user ID that is associated with (e.g., unique to) the user device 202 and/or user A, and as shown by reference number 256, may provide the user ID to the user validation system/database 208. In various embodiments, the provider-based authentication system 212 may facilitate return access to the authentication management system 210 or the user validation system/database 208. In one or more embodiments, for example, the provider-based authentication system 212 may facilitate the access via a redirect request or the like such that the validation request app or browser of the device 204 is directed/redirected to the user validation system/database 208.

As shown by reference number 258, the user validation system/database 208 may perform a look up operation using the user ID, obtain/retrieve data (e.g., user A's birthdate, vaccination status, etc.) associated with the user ID, and perform a validation of user A using some or all of the data. In a case where an age check is requested, for instance, the validation may include calculating user A's age based on the present date and user A's birthdate and determining whether the calculated age satisfies a threshold at issue (e.g., over eighteen years of age). As another example, in a case where a vaccination status check is requested, the validation may include determining whether there exists one or more records of user A's prior vaccinations.

As shown by reference number 260, the user validation system/database 208 may provide (e.g., in a session table or the like) a result of the validation to the backend system 206. In various embodiments, a validation result may be binary (e.g., in the form of a true/false statement, such as "true" that user A is over eighteen years of age, etc.). In certain embodiments, the user validation system/database 208 may provide additional information along with the validation result, such as an ID associated with user A, user A's identification photo, or the like. In one or more embodiments, the user validation system/database 208 may facilitate return access to the backend system 206 via, for example, a redirect request or the like such that the validation request app or browser of the device 204 is directed/redirected to the backend system 206. In some embodiments, the user validation system/database 208 may retrieve cookie(s) for and/or lookup a session associated with the initial validation request and facilitate the return access based thereon. As shown by reference number 262, the backend system 206 may then provide the validation result (and any available additional information) to the device 204, which the device 204 may present (e.g., visually, audibly and/or haptically) for consideration/review by user B.

In one or more embodiments, one or more of steps 260, 262, and 264 may be performed via a redirect of the validation request app or browser of the device 204 with an HTTPS POST request back to the backend system 206. Here, the backend system 206 may receive the validation result (and any available additional information) and update the validation request app or web page for the device 204.

In alternate embodiments, one or more of steps 260, 262, and 264 may not be performed using an HTTPS POST (e.g., user validation system/database 208 might not communicate directly with the validation request app or browser of the device 204), but may rather involve the user validation system/database 208 providing the backend system 206 with access to the validation result (and any available additional information). Here, the access may be by way of the abovementioned validation request data (e.g., the request code/ID) and/or the abovementioned authentication/session data (e.g., the token or session ID). For instance, in at least some of these embodiments, the backend system 206 may be redirected with the authentication/session data (e.g., the token or session ID) to obtain (e.g., pull) the validation result (and any available additional information) from the user validation system/database 208 for subsequent transmission to the device 204.

It is to be appreciated and understood that the above-described authentication system can be provided using any suitable authentication implementation or mechanism. For example, in alternate embodiments, a trusted authentication system (e.g., provided by a single entity) may be utilized in addition to, or as a substitute for, one or more of the authentication management system 210 and the provider-based authentication system 212. Here, the trusted authentication system may provide multi-factor authentication of user devices, such as user device 202, via PINs, biometric data, or other verification technique(s).

It is also to be understood and appreciated that the quantity and arrangement of systems, databases, and devices shown in FIG. 2A are provided as an example. In practice, there may be additional systems, databases, and/or devices, fewer systems, databases, and/or devices, different systems, databases, and/or devices, or differently arranged systems, databases, and/or devices than those shown in FIG. 2A. For example, the trusted system 200 can include more or fewer systems, databases, and/or devices, etc. In practice, therefore, there can be hundreds, thousands, millions, billions, etc. of such systems, databases, and/or devices. In this way, example system 200 can coordinate, or operate in conjunction with, a set of systems, databases, and/or devices and/or operate on data sets that cannot be managed manually or objectively by a human actor. Furthermore, two or more systems, databases, or devices shown in FIG. 2A may be implemented within a single system, database, or device, or a single system, database, or device shown in FIG. 2A may be implemented as multiple systems, databases, or devices. Additionally, or alternatively, a set of systems, databases, or devices of the system 200 may perform one or more functions described as being performed by another set of systems, databases, or devices of the system 200.

While for purposes of simplicity of explanation, the respective processes are shown and described as various steps in FIGS. 2A-2C, it is to be understood and appreciated that the claimed subject matter is not limited by the order of the steps, as some steps may occur in different orders and/or concurrently with other steps from what is depicted and described herein. Moreover, not all illustrated steps may be required to implement the methods described herein.

Figure 2D:
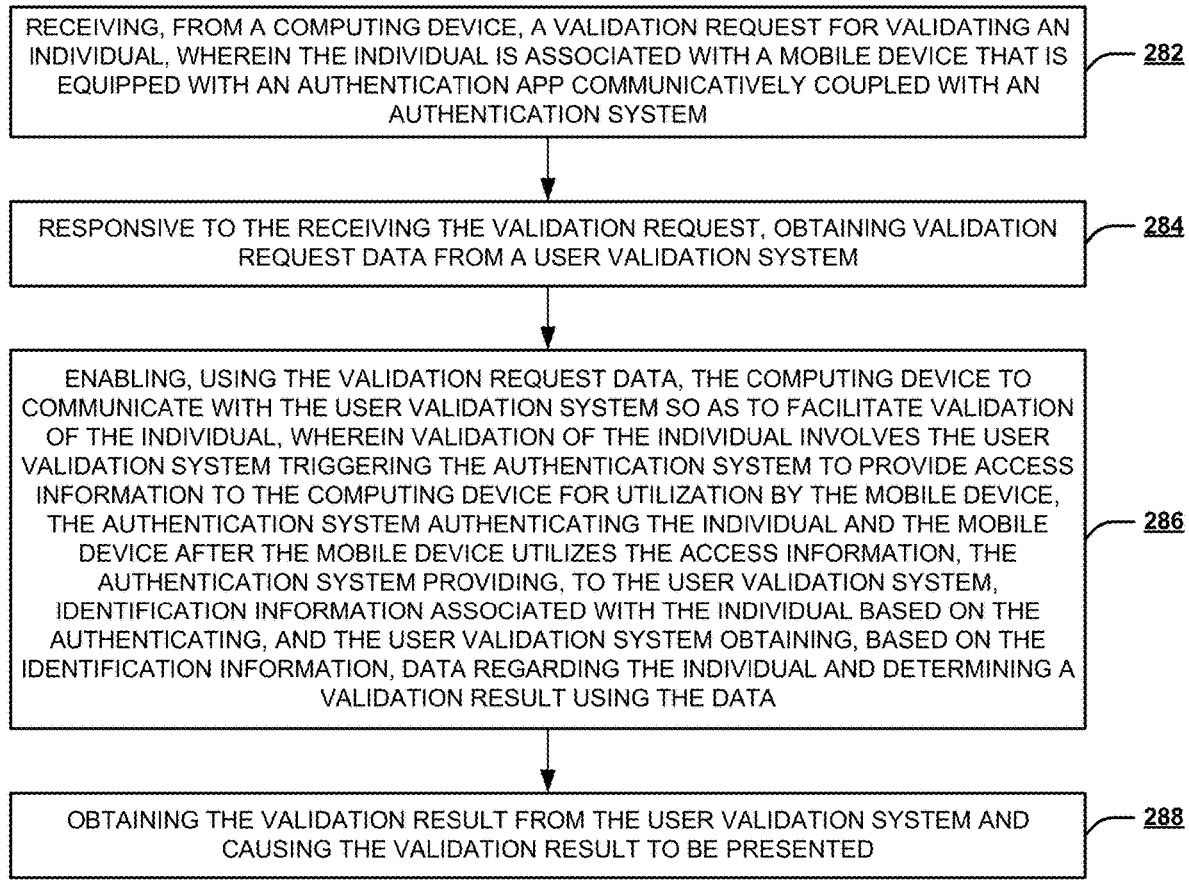
FIG. 2D depicts an illustrative embodiment of a method in accordance with various aspects described herein.

FIG. 2D depicts an illustrative embodiment of a method 280 in accordance with various aspects described herein. In some embodiments, one or more process blocks of FIG. 2D can be performed by a backend system, such as the backend system 206. In some embodiments, one or more process blocks of FIG. 2D may be performed by another device or a group of devices separate from or including the backend system, such as the user device 202, the device 204, the user validation system/database 208, the authentication management system 210, and/or the provider-based authentication system 212. In various embodiments, a device may comprise a processing system including a processor, and a memory that stores executable instructions that, when executed by the processing system, facilitate performance of operations, where the operations may include steps 282, 284, 286, and 288 described below.

At 282, the method can include receiving, from a computing device, a validation request for validating an individual, wherein the individual is associated with a mobile device that is equipped with an authentication app communicatively coupled with an authentication system. For example, the backend system 206 can receive, from a computing device, a validation request for validating an individual in a manner similar to that described above with respect to the system 200 of FIG. 2A, where the individual is associated with a mobile device that is equipped with an authentication app communicatively coupled with an authentication system.

At 284, the method can include, responsive to the receiving the validation request, obtaining validation request data from a user validation system. For example, the backend system 206 can, responsive to the receiving the validation request, obtain validation request data from a user validation system in a manner similar to that described above with respect to the system 200 of FIG. 2A.

At 286, the method can include enabling, using the validation request data, the computing device to communicate with the user validation system so as to facilitate validation of the individual, wherein validation of the individual involves the user validation system triggering the authentication system to provide access information to the computing device for utilization by the mobile device, the authentication system authenticating the individual and the mobile device after the mobile device utilizes the access information, the authentication system providing, to the user validation system, identification information associated with the individual based on the authenticating, and the user validation system obtaining, based on the identification information, data regarding the individual and determining a validation result using the data. For example, the backend system 206 can enable, using the validation request data, the computing device to communicate with the user validation system so as to facilitate validation of the individual in a manner similar to that described above with respect to the system 200 of FIG. 2A, where validation of the individual involves the user validation system triggering the authentication system to provide access information to the computing device for utilization by the mobile device, the authentication system authenticating the individual and the mobile device after the mobile device utilizes the access information, the authentication system providing, to the user validation system, identification information associated with the individual based on the authenticating, and the user validation system obtaining, based on the identification information, data regarding the individual and determining a validation result using the data.

At 288, the method can include obtaining the validation result from the user validation system and causing the validation result to be presented. For example, the backend system 206 can obtain the validation result from the user validation system and causing the validation result to be presented in a manner similar to that described above with respect to the system 200 of FIG. 2A.

In some implementations of these embodiments, the validation of the individual comprises validation of an age of the individual, a vaccination status of the individual, or a combination thereof.

In some implementations of these embodiments, the computing device is associated with an entity having a need to validate the individual for purposes of providing a product or service to the individual.

In some implementations of these embodiments, the computing device is equipped with a validation request app or has access to a web page for obtaining the validation request from the computing device and for presenting the validation result.

In some implementations of these embodiments, the validation request data comprises a request code or request ID.

In some implementations of these embodiments, the authentication system comprises an authentication management system and a provider-based authentication system, wherein the provider-based authentication system corresponds to a particular network carrier, and wherein the provider-based authentication system is configured to provide mobile or user identity verification via authentication of subscriber accounts or subscriber identity modules (SIMs). In some implementations of these embodiments, the authentication management system is associated with a plurality of provider-based authentication systems corresponding to different network carriers. In some implementations of these embodiments, the device is provided or operated by a third-party entity different from entities that provide or operate the provider-based authentication system and the user validation system.

In some implementations of these embodiments, the access information comprises a quick response (QR) code, and wherein the mobile device utilizes the access information by scanning the QR code.

In some implementations of these embodiments, the user validation system comprises a trusted source or database and stores personal information relating to a plurality of individuals that includes the individual.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
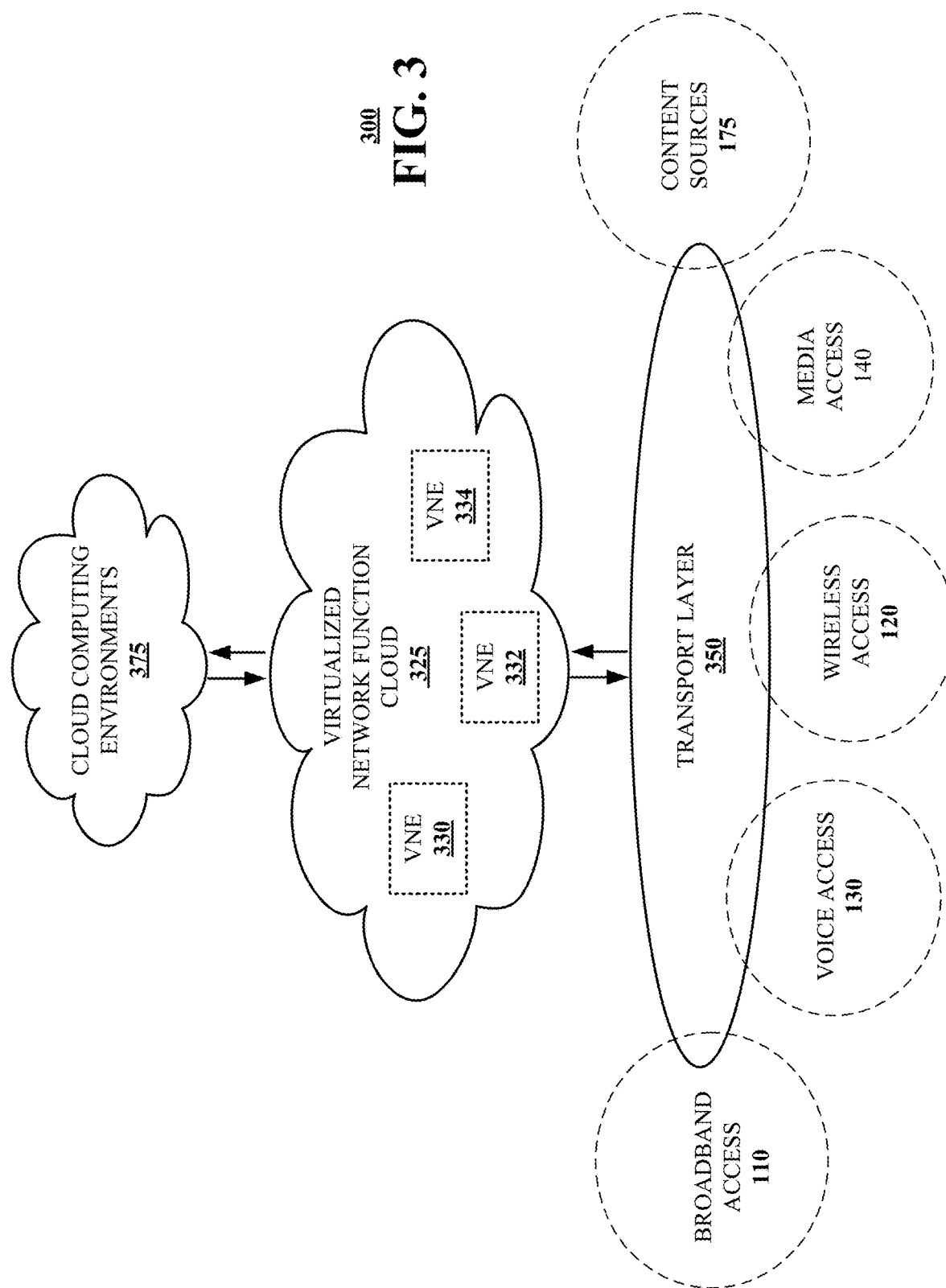
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of system 200, and method 280 presented in FIGS. 1 and 2A-2D. For example, virtualized communications network 300 can facilitate, in whole or in part, privacy-preserving validation of an individual, such as that described herein with respect to FIGS. 2A-2D.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
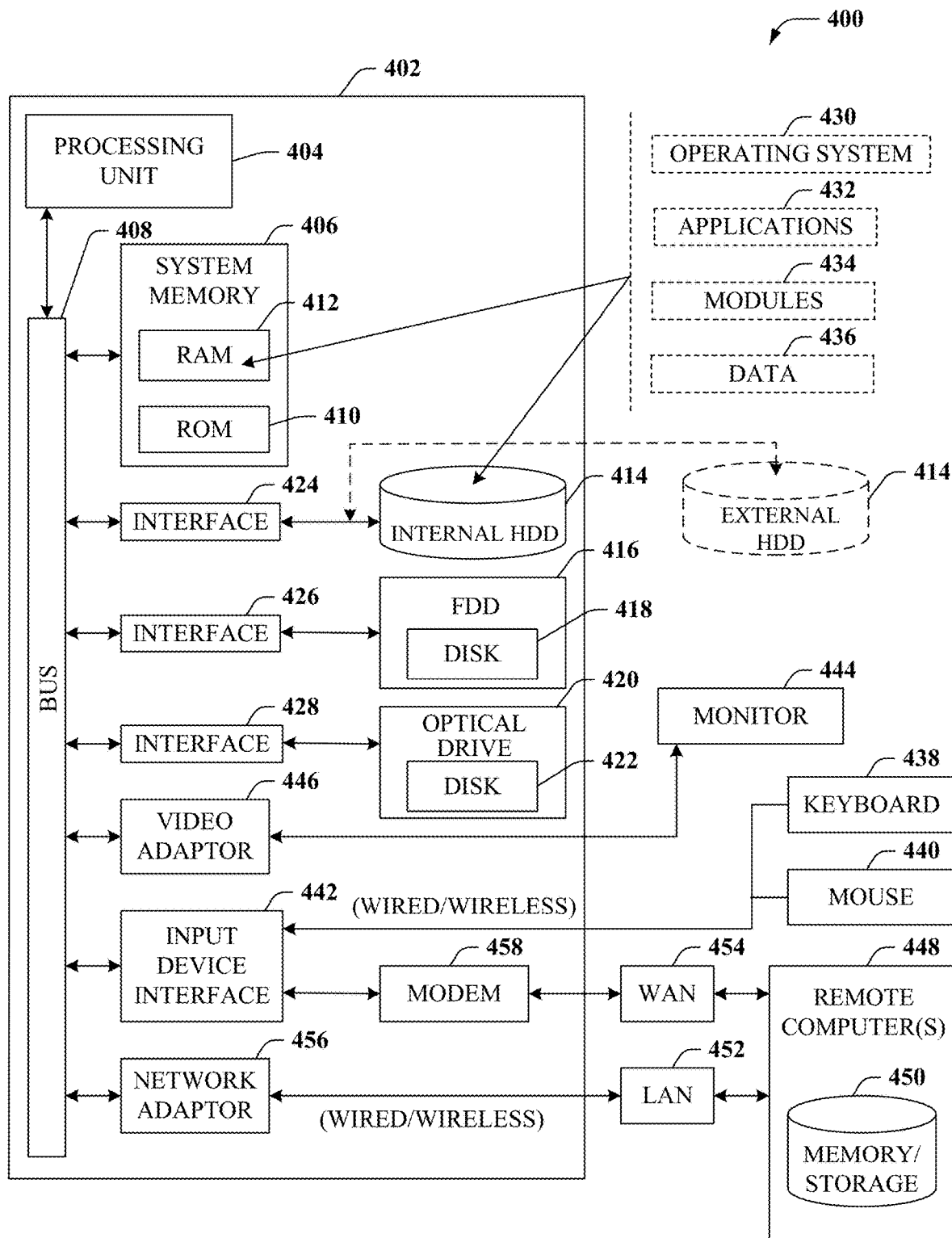
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, privacy-preserving validation of an individual, such as that described herein with respect to FIGS. 2A-2D.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
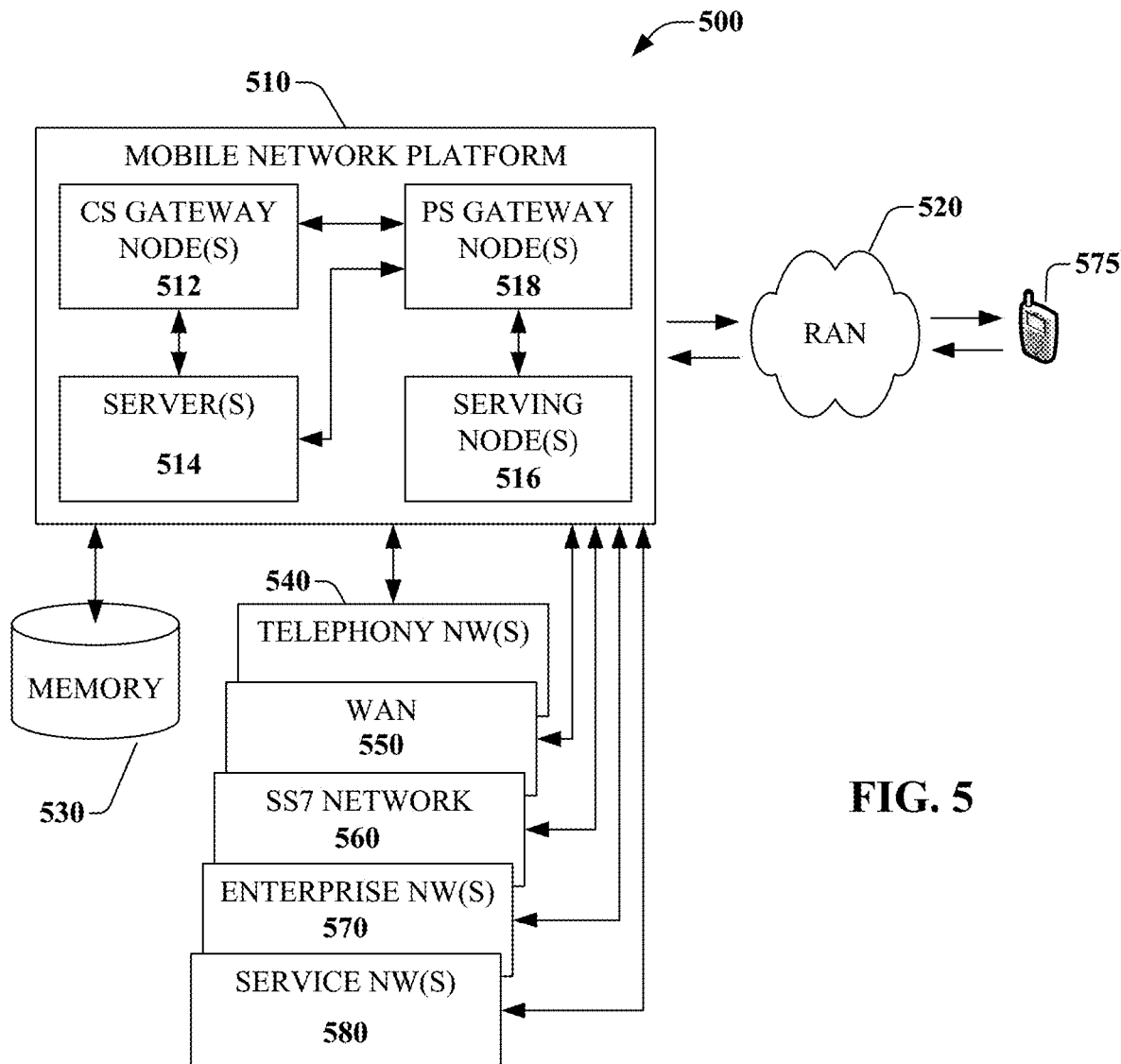
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, privacy-preserving validation of an individual, such as that described herein with respect to FIGS. 2A-2D. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3 GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3 GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
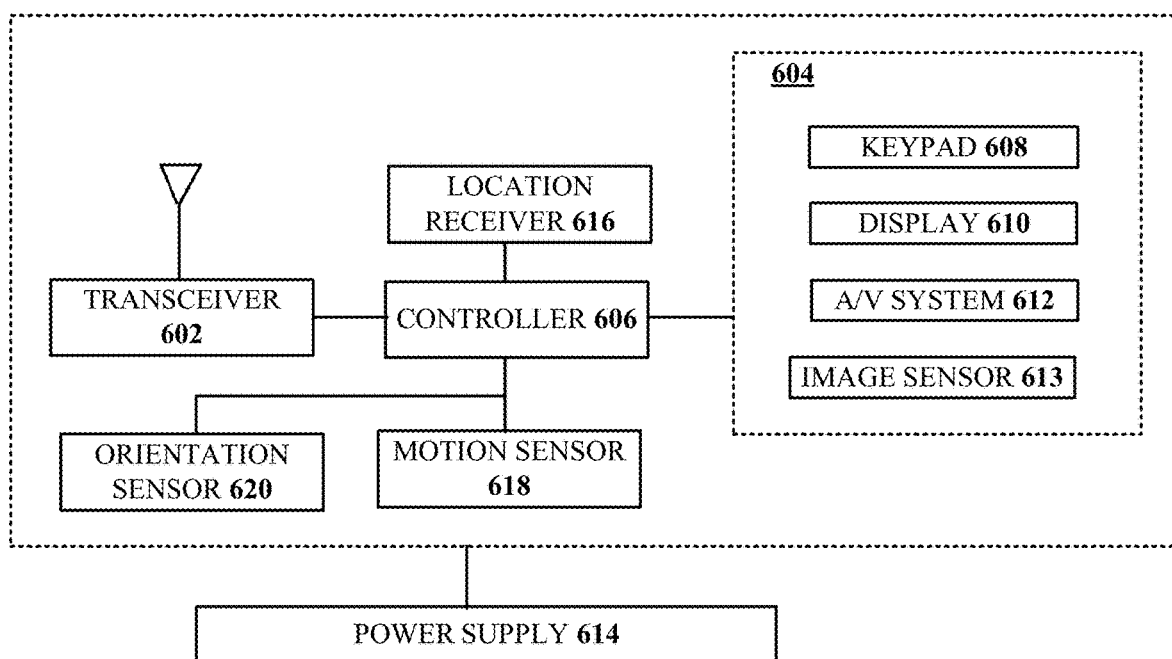
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate, in whole or in part, privacy-preserving validation of an individual, such as that described herein with respect to FIGS. 2A-2D.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=$ confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A backend device, comprising:
a processing system including a processor; and
a memory that stores executable instructions that, when executed by the processing system, facilitate performance of operations, the operations comprising:
receiving, from an end user device, a validation request for validating an individual, wherein the individual is associated with a mobile device that is equipped with an authentication app communicatively coupled with an authentication system;
responsive to the receiving the validation request, obtaining validation request data from a user validation system;
enabling, using the validation request data, the end user device to communicate with the user validation system so as to facilitate validation of the individual, wherein the validation of the individual involves the user validation system triggering the authentication system to provide access information to the end user device for utilization by the mobile device, the authentication system authenticating the individual and the mobile device after the mobile device utilizes the access information, the authentication system providing, to the user validation system, identification information associated with the individual based on the authenticating, and the user validation system obtaining, based on the identification information, data regarding the individual and determining a validation result using the data; and
obtaining the validation result from the user validation system and causing the validation result to be presented to the end user device, wherein the validation result comprises an identification photo of the individual.

2. The backend device of claim 1, wherein the validation of the individual involves use of personally identifiable information (PII) associated with the individual.

3. The backend device of claim 1, wherein the end user device is associated with an entity having a need to validate the individual for purposes of providing a product or service to the individual.

4. The backend device of claim 1, wherein the end user device is equipped with a validation request app or has access to a web page for obtaining the validation request from the end user device and for presenting the validation result.

5. The backend device of claim 1, wherein the validation request data comprises a request code or request ID.

6. The backend device of claim 1, wherein the authentication system comprises an authentication management system and a provider-based authentication system, wherein the provider-based authentication system corresponds to a particular network carrier, and wherein the provider-based authentication system is configured to provide mobile or user identity verification via authentication of subscriber accounts or subscriber identity modules (SIMs).

7. The backend device of claim 6, wherein the authentication management system is associated with a plurality of provider-based authentication systems corresponding to different network carriers.

8. The backend device of claim 6, wherein the device is provided or operated by a third-party entity different from entities that provide or operate the provider-based authentication system and the user validation system.

9. The backend device of claim 1, wherein the access information comprises a quick response (QR) code, and wherein the mobile device utilizes the access information by scanning the QR code.

10. The backend device of claim 1, wherein the user validation system comprises a trusted source or database and stores personal information relating to a plurality of individuals that includes the individual.

11. A non-transitory machine-readable medium, comprising executable instructions that, when executed by a processing system including a processor, facilitate performance of operations, the operations comprising:
receiving, from a backend system, a request associated with validating an individual, wherein the individual is associated with a mobile device that is equipped with an authentication app communicatively coupled with an authentication system;
responsive to the receiving the request, generating request data and providing the request data to the backend system, wherein the request data, when utilized by an end user device associated with the backend system, causes a process to be performed for validating the individual;
detecting use of the request data by the end user device;
based on the detecting, triggering the authentication system to provide access information to the end user device to be utilized by the mobile device;

after the triggering and authentication processing for the mobile device by the authentication system, obtaining, from the authentication system, identification information associated with the individual;

determining a validation result using data relating to the identification information; and causing the validation result to be provided to the end user device for presentation, wherein the validation result comprises an identification photo of the individual.

12. The non-transitory machine-readable medium of claim 11, wherein the validating the individual involves use of personally identifiable information (PII) associated with the individual.

13. The non-transitory machine-readable medium of claim 11, wherein the authentication system is associated with a plurality of provider-based authentication systems corresponding to different network carriers.

14. The non-transitory machine-readable medium of claim 11, wherein the operations further comprise, prior to the receiving the request associated with validating the individual:

receiving an authorization request from the backend system; and based on the receiving the authorization request, providing a session ID or authorization code to the backend system.

15. The non-transitory machine-readable medium of claim 11, wherein the causing the validation result to be provided to the end user device involves use of a Hypertext Transfer Protocol Secure (HTTPS) POST or a direct communication from the backend system to the end user device.

16. A method, comprising:

presenting, by a processing system of an end user device including a processor, a selectable option for initiating a validation process;

detecting, by the processing system, a user selection of the selectable option;

based on the detecting the user selection, transmitting, by the processing system, a validation request to a backend system;

responsive to the transmitting, obtaining, by the processing system, validation request data from the backend system, wherein the validation request data is provided by a user validation system based on the validation request;

performing, by the processing system and based on the validation request data, an action to cause the user validation system to initiate validation of an individual, wherein the individual is associated with a mobile device that is equipped with an authentication app communicatively coupled with an authentication system;

based upon the performing, obtaining, by the processing system, access information from the authentication system;

presenting, by the processing system, the access information for utilization by the mobile device, wherein the utilization triggers authentication of the individual and the mobile device by the authentication system, providing of identification information associated with the individual by the authentication system to the user validation system, and determination of a validation result by the user validation system based on data associated with the identification information;

obtaining, by the processing system, the validation result from the user validation system or the backend system; and causing, by the processing system, the validation result to be presented for user review or consideration, wherein the validation result comprises an identification photo of the individual.

17. The method of claim 16, wherein the validation of the individual involves use of personally identifiable information (PII) associated with the individual.

18. The method of claim 16, further comprising presenting progress information associated with the validation of the individual during one or more of the authentication of the individual and the mobile device, the providing of the identification information, and the determination of the validation result.

19. The method of claim 16, wherein the validation request comprises a Hypertext Transfer Protocol Secure (HTTPS) request.

20. The method of claim 16, wherein the end user device is associated with an account registered with the backend system or the user validation system, and wherein the account permits submission of validation requests to the backend system or the user validation system for validation of individuals.

* * * * *